United States Patent
Al-Eidan

(10) Patent No.: US 7,653,152 B2
(45) Date of Patent: Jan. 26, 2010

(54) FREQUENCY MEASUREMENT SYSTEM FOR LOW MODULATION INDEX DIGITAL FM/PM COMMUNICATION

(76) Inventor: Abdullah A. Al-Eidan, P.O. Box 67175, Bayan (KW) 43762

( * ) Notice: Subject to any disclaimer, the term of this patent is extended or adjusted under 35 U.S.C. 154(b) by 491 days.

(21) Appl. No.: 11/459,693

(22) Filed: Jul. 25, 2006

(65) Prior Publication Data

US 2008/0025439 A1  Jan. 31, 2008

(51) Int. Cl.
*H04L 27/24* (2006.01)
*H03D 3/00* (2006.01)

(52) U.S. Cl. .................. 375/334; 375/272; 375/324; 375/340; 375/373; 329/315; 329/316; 329/318

(58) Field of Classification Search ............... 375/316, 375/324, 373, 443, 272, 340; 329/315, 316, 329/318
See application file for complete search history.

(56) References Cited

U.S. PATENT DOCUMENTS 4,423,519 A * 12/1983 Bennett et al. ............... 375/324
2005/0123071 A1 * 6/2005 Okada et al. ................ 375/316

* cited by examiner

*Primary Examiner*—Phuong Phu
(74) *Attorney, Agent, or Firm*—Lowe Hauptman Ham & Berner, LLP

(57) ABSTRACT

Apparatus and methods for data demodulation in FM-FSK communication systems may include comparing the power spectral density (PSD) of the received frequency spectrum with that of the previously received samples using digital signal processing on a multi-sample message. A narrow band FM-FSK receiver may include a filter configured to pass FM signal components of a predetermined signal band, a memory configured to store the filtered signal component, and a DSP operably connected to the filter and the memory. The DSP may be configured to output a digital signal based upon a comparison of successive DSP calculated frequencies associated with a peak power of a power spectrum density (PSD) of successive samples of the filtered multi-sample message.

15 Claims, 12 Drawing Sheets

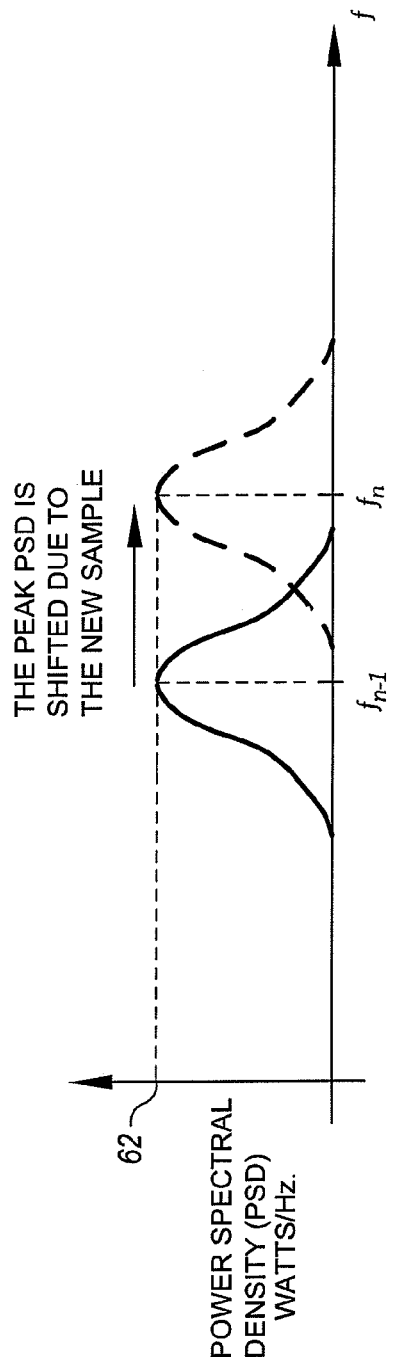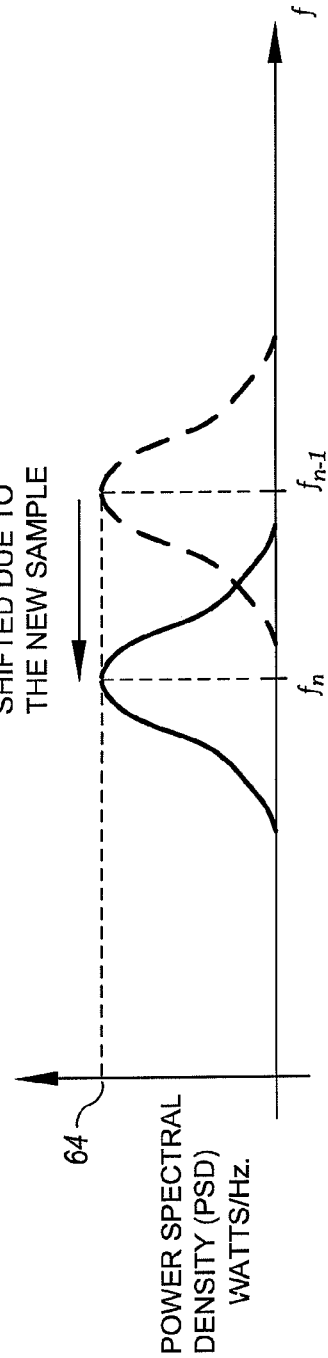

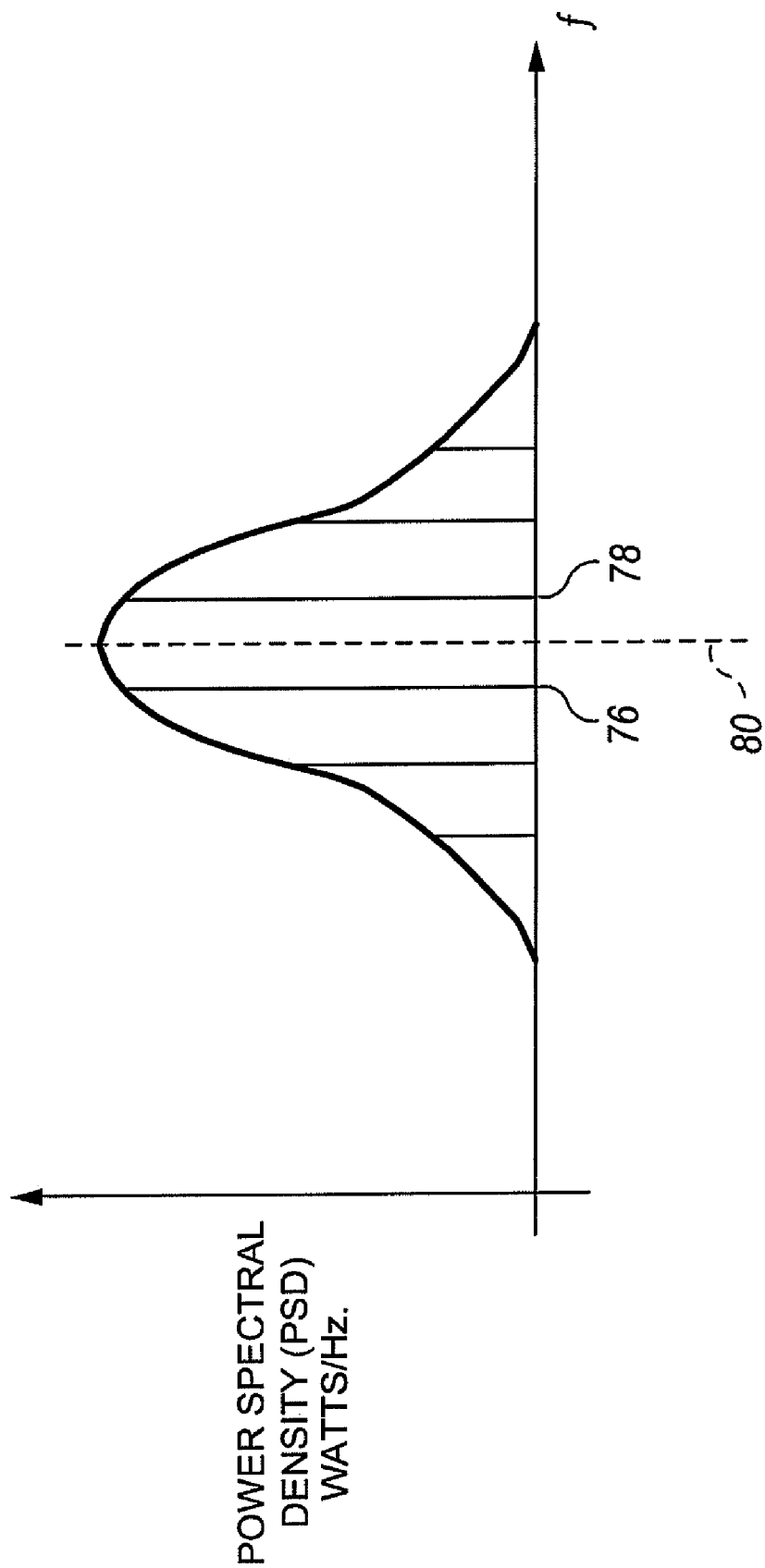

FREQUENCY MEASUREMENT SYSTEM FOR LOW MODULATION INDEX DIGITAL FM/PM COMMUNICATION

CROSS REFERENCE TO RELATED APPLICATIONS

This invention is related to U.S. Pat. No. 7,027,505 entitled "System and Method for Bandwidth Compression of Frequency and Phase Modulation Signals and Suppression of the Upper and Lower Sidebands From the Transmission Medium," to A. Al-Eidan, and hereby incorporated by reference in its entirety.

BACKGROUND

The disclosed embodiments relate to frequency measurements and the detection of digital data using digital signal processors (DSP) in frequency shift keying (FSK) based communication systems. Specifically, the invention relates to a communications system and method for transmitting and receiving digital data using FSK and frequency modulation (FM) techniques on narrowband or very narrowband channels.

Most basic communication systems use frequency references. A frequency reference is a stable signal (source) with a constant frequency. It can be a ceramic resonator or a quartz crystal oscillator. The ceramic resonator is often used instead of crystal because of its lower price. The frequency accuracy is not as good as a crystal but in many applications the accuracy is not critical. The ceramic resonator is a two terminal device with impedance containing both a real and reactive elements.

Quartz crystals are also used in communication systems and are based on the piezoelectric effect, and they can give an accurate frequency to be used for example as a LO (local oscillator) signal in a super heterodyne receiver. The electronics inside a personal computer are often synchronized to a quartz crystal clock signal.

The quality of the reference frequency required depends on the application. High precision is often required in measurement applications and the reference frequency should be both extremely accurate and very precise. There are a few common ways to provide a good reference. For example, using a Global Positioning System (GPS) satellite signal or the TV line frequency signal can be used. If temperature stability is a requirement, quartz crystal may be put inside a thermally insulated enclosure which is called an oven. Another way to enhance temperature stability is to use a Voltage Controlled Temperature Compensated Crystal Oscillator (VCTX), which is an oscillator based on a tuning circuit which keeps the frequency stable. VCTXOs can be quite small integrated parts and often used in GSM mobile equipment i.e. mobile phones.

Frequency counters use a digital counting technique to determine the frequency of an unknown signal. A frequency counter consists of an accurate clock signal source, a gate circuit and a digital counter. Frequency counters can be divided in three main categories: heterodyne counters, transfer oscillator (or phase lock) counters and direct digital counters.

The direct digital counter counts pulses as long as the gate circuit is open. The gate is kept open, for example exactly for one second, by clocking it with the accurate clock or gate signal. As mentioned, the counter counts pulses into a register until the gate is closed. The unknown frequency can then be calculated simply by dividing the number of the pulses counted by the time the gate circuit was open. This kind of frequency counter is called a direct digital counter.

The input frequency range of a frequency counter can be extended by adding a prescaler between the signal input and the counter. The prescaler is a digital (binary counter) circuit that divides the frequency of the measured signal by some constant, e.g. 1000.

Frequency counters built with fast digital integrated circuits are able to measure frequencies of up to 1 GHz. The limit is set by the maximum speed of the digital logic. Prescalers used in commercial frequency counters are able to extend the frequency range to about 3 GHz. Using GaAs (Gallium Arsenide) circuits it's possible to build prescalers that are able to manage 10 GHz. However, this frequency measurement method is not suitable for high data rate FM communication system as it requires transmitting many cycles per bit.

Phase locked frequency counters are based on phase locking the measured signal to a low-frequency voltage controlled oscillator (VCO). The low-frequency signal can be measured with a normal counter (for example with the direct digital counter) and the frequency of the measured signal is then N times the frequency shown on the counter output, where N is the order of the harmonic frequency to which the oscillator was locked to. The phase lock counter uses a comb generator to generate harmonic frequencies. A harmonic frequency is then filtered out from the comb spectrum and fed into a mixer. If the mixture is not equal to zero, the frequency is tuned by changing the control voltage of the VCO. Upon locking, the measured frequency is N times the frequency measured with the counter.

The phase locked frequency counter has two drawbacks. First, its resolution is reduced by factor N compared to a direct digital counter measuring the same range. Second, continuous phase locking of a frequency modulated (FM) signal may be difficult, at least when the frequency deviation of the input signal is wide.

A heterodyne frequency counter uses heterodyne mixing to extend the frequency range of a direct digital counter. In a heterodyne counter the measured signal is transferred to a lower frequency band by mixing it with an extremely stable local oscillator (LO).

A comb generator creates harmonic frequencies from which one can be selected (with a narrow (switched) filter) and filtered out. The filtered harmonic frequency is then fed into a mixer. The mixture will generate the difference frequency which can easily be measured with a direct digital counter and then unknown input frequency is calculated.

High frequency measurement using counters takes a relative long time for counting and determining the frequency, which has the effect of reducing the data rate. Also this heterodyne technique limits the data rate with the resulting low (Beat) frequency signal, as a relatively long time is needed to measure one cycle of this frequency. Accordingly, this method is not well suited for high data rate FM communication systems.

Digital Phase Locked Loop (DPLL) technology uses a digital phase locked loop to measure the frequency of a high frequency signal, and represents the state of the art in high frequency measurement, measuring the frequency in one or two cycles of the received frequency.

U.S. Pat. No. 6,630,820 describes a method and apparatus for measuring instantaneous frequency of FM modulated signal, however this technique of digitizing the FM signal and computing the instantaneous frequency is not fast enough for high speed digital FSK-NBFM applications.

The automatic tunable band pass filter (BPF) may be designed with an internal PLL to track the band at which the power is concentrated and when the BPF locks on the band, the data can be determined. The advantage of using such a method is the hardware reduction that would result if one tunable BPF can be used to track more than one carrier at the same time, i.e., switching or time division multiplexing (TDM).

Although U.S. Pat. No. 5,757,858 discloses a dual mode digital communication system based upon a frequency modulated (FM) mode and a code division multiple-access (CDMA) mode, it fails to disclose a digital FSK method.

Similarly, although U.S. Pat. No. 6,484,112 describes a method for estimating the frequency of a time signal by means of a discrete Fourier transformation and interpolation, it fails to analyze multi-sample messages at high speed in order to determine the peak of spectral power density.

BRIEF SUMMARY

The present disclosure provides a fast method for real time frequency measurement in a digital FM system by measuring the power spectral density (PSD) of the received data. Unlike previous frequency measurement methods that measure the frequency itself, in a PSD measuring system, the peak of the power spectrum density is measured for each symbol duration (or cycle) and compared to a previously determined peak, to determine whether the peak has shifted to left or right when compared to the frequency, or central frequency, of the previous sample.

In narrowband FSK systems, by suppressing the transmission of upper and lower sidebands of a narrowband or very narrowband FM/PM signal, the transmitted signal will have a small limited bandwidth such that transmission is limited to the instantaneous mark and space frequencies varied about the center frequency. Through sideband suppression, bandwidth requirements are reduced without affecting the data rate. Since the noise power is proportional to the modulated signal bandwidth then the signal to noise ratio is improved with the narrow band frequency modulated signal. Narrow or very narrow band channels are used in order that the number of channels available for different types of communication systems can be increased. Applications for narrowband communication systems include, for example, cellular telephones, wireless local area network, WLAN, pagers, and police/fire/rescue, e.g. the ad hoc wireless network based on FSK FDM for stolen car identification by the police.

Unlike a relatively unsophisticated FSK system that measures mark and space frequencies with respect to the carrier frequency that is usually the center frequency between the mark and space, a narrow band frequency multiplex-frequency shift keying, NBFM-FSK, digital communication system has a small limited bandwidth and compares the received, frequency with the frequency of a previously received sample. In a multi-sample message, if the current frequency is greater than the previous frequency, then a "1" is received, otherwise a "0" is received.

When a large number of the same level bits are transmitted (i.e. a long sequence of all 0's or all 1's is are transmitted) then the peak of the power spectral frequency transmitted will saturate at the selected mark or space frequency and the receiver will recognize this case and evaluate the output.

The location of the peak of the power spectral density of the received message may also be used as an indicator on the value of frequency of the received sample.

Unlike an FSK system that uses a data rate dependent on the bandwidth of the transmitted signal, the NBFM-FSK system disclosed herein uses fast real-time, message based, frequency measurement methods to achieve data rates that are higher than would be expected based upon the bandwidth.

The data rate is dependent on the frequency measurement speed and accuracy. The accuracy of the frequency measurement using multiple fast DSP processors can be of the order of few Hertz (from 1 Hz to 100 Hz).

In one aspect, a method for detecting modulated data within a signal band may comprise comparing a determined frequency of a current data sample with a frequency of a previous data sample and determining an output value of the received data sample based upon the comparison.

A narrow band frequency modulated (NBFM) communication apparatus operable to perform the above method may comprise a digital phase lock loop (DPLL) configured to receive a NBFM signal, wherein the DPLL may be configured to generate a DC voltage output corresponding to a frequency of the received NBFM signal. The apparatus may further include a quantizer circuit configured to receive the DC output voltage and generate a digital signal corresponding to the frequency of the received NBFM signal, a memory configured to store the digital signal generated by the quantizer circuit, and a comparator and decision device configured to compare a digital signal generated by the quantizer circuit with a previous digital signal stored in the memory and generate a binary output signal based upon the comparison.

Another aspect may include a method for demodulating FM FSK received data, comprising measuring a difference in frequency between sequential samples of received data.

A further aspect of a narrow band FM-FSK receiver operable to perform the above method may include a filter configured to pass FM signal components of a predetermined signal band, a memory configured to store a predetermined number of filtered signal samples, and a digital signal processor (DSP) operably connected to the memory, the DSP configured to output a digital signal based upon a comparison of successive calculated frequencies associated with a peak power of a power spectrum density (PSD) of successive samples of the filtered FM signal samples.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which:

FIG. 6 Reception of a "1" based on Peak PSD measurement algorithm according to the DSP subsystem of FIG. 5;

FIG. 7 Reception of a "0" based on Peak PSD measurement algorithm according to the DSP subsystem of FIG. 5;

FIG. 8 illustrates the PSD and center frequency at the peak of the PSD according to the DSP subsystem of FIG. 5;

DETAILED DESCRIPTION

In frequency modulation/phase modulation FM/PM, there are two stages of frequency deviation. The first stage, where primary frequency deviation is performed, occurs in the frequency/phase modulator. In the modulator, the carrier frequency fluctuates or deviates at a rate according to the amplitude or to the amplitude and frequency of the modulating signal. The second stage, where secondary frequency deviation is performed, occurs in the frequency multiplier stage. The result of the two stages of frequency deviation offers a means for obtaining practically any desired amount or value for the carrier frequency, frequency deviation and modulation index.

A modulation index is a quantity that indicates by how much the modulated variable varies around its unmodulated level. For FM, the modulation index relates to the variations in the frequency of the carrier signal and is equal to:

$$h = \frac{\Delta f}{f_m}$$

In an FM/PM receiver, the value of the modulation index h determines the accuracy of the demodulated data. If the modulation index is high, thereby corresponding to a high level of frequency deviation (wideband), the frequency discriminator becomes more sensitive, can detect minor modulating signals, and has a better signal to noise ratio.

Figure 1:
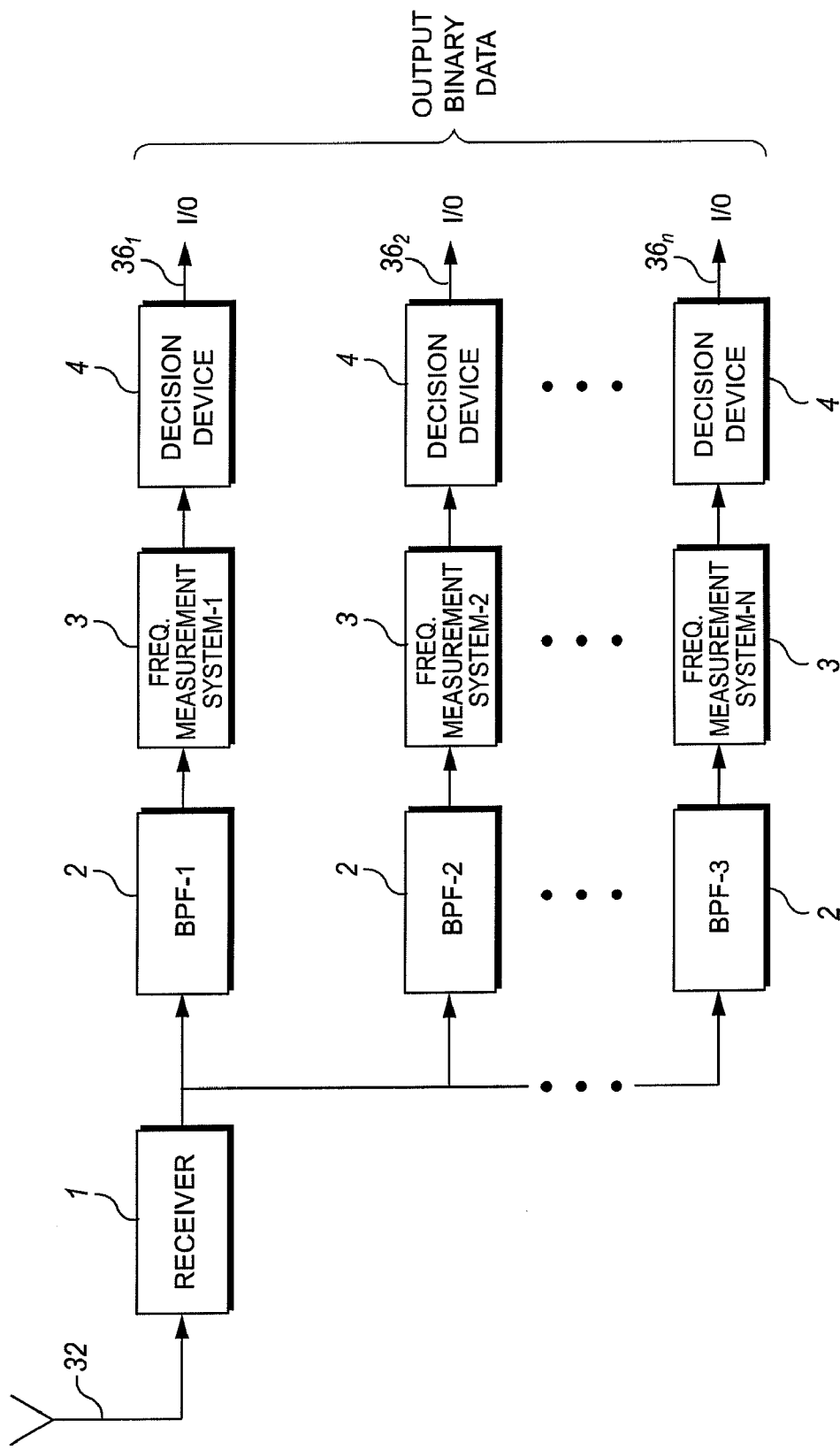
FIG. 1 is a block diagram of one aspect of a NBFM-FSK receiver system.

FIG. 1 illustrates one aspect of a block diagram of a narrow band frequency modulation-frequency shift keying (NBFM-FSK) communication system 100. One aspect of the invention includes a FM/PM receiver 1 in which a frequency or phase modulated signal is received over a communication channel comprises a predetermined small or very small frequency deviation (modulation index M less than or equal to 0.2), resulting in a small/very small frequency band, and with upper and lower sideband suppression. Reception of the signal may be facilitated by an antenna 32 or by any means including but not limited to a hardwired connection to a transmitter, not shown.

Sideband suppression may be obtained by adding a band pass filter between the modulator and the power amplifier of an existing narrowband FM transmitter. By including such a filter, the transmitted power in the narrowband FM signal is concentrated in the instantaneous frequency varied about the carrier frequency (center frequency) which dramatically reduces the bandwidth requirement without adversely affecting sound quality. In addition, the signal-to-noise ration ratio (SNR) may be improved as a result of all the transmitted power being provided to transmit intelligence, i.e., the transmitted signal.

After the frequency or phase modulated signal is received by the antenna 32 on the receiving side of the communication channel, the receiver 1 may expand the frequency deviation of the received signal. This frequency deviation expansion at the receiving side of the communication channel may be realized by frequency multiplication, as disclosed in U.S. Pat. No. 7,027,505 entitled "System and Method for Bandwidth Compression of Frequency and Phase Modulation Signals and Suppression of the Upper and Lower Sidebands From the Transmission Medium," to A. Al-Eidan, incorporated by reference in its entirety, and further discloses details regarding FM/PM transmission and reception, including the modulation index and sideband suppression methods and apparatus.

A communication system may include one or multiple carrier frequencies. Still referring to FIG. 1, the multi carrier NBFM-FSK communication system 100 allows for the simultaneous reception of multiple data streams modulated into separate frequency bands, thereby increasing data throughput. Accordingly, communication system 100 may comprise of at least one band pass filter (BPF) 2 operable to receive the output of the receiver 1 and separate the bands of mark and space frequencies defined by the multiple carrier frequencies.

Frequency separation may be achieved based upon at least two methods, analog and digital. The embodiments disclosed herein apply both analog and digital band pass filters, and may employ matched filters that in addition to allowing through all the signal frequency components, take more notice of signal frequencies having large components and so contribute more to improving the overall signal-to-noise ratio. By weighting the contributions from each filter band proportionally to the signal power, a matched filter gives the best possible improvement in signal to noise ratio. Matched filters are known in the field of digital signal processing and may be implemented utilizing discrete components or a single DSP device.

Figure 11:
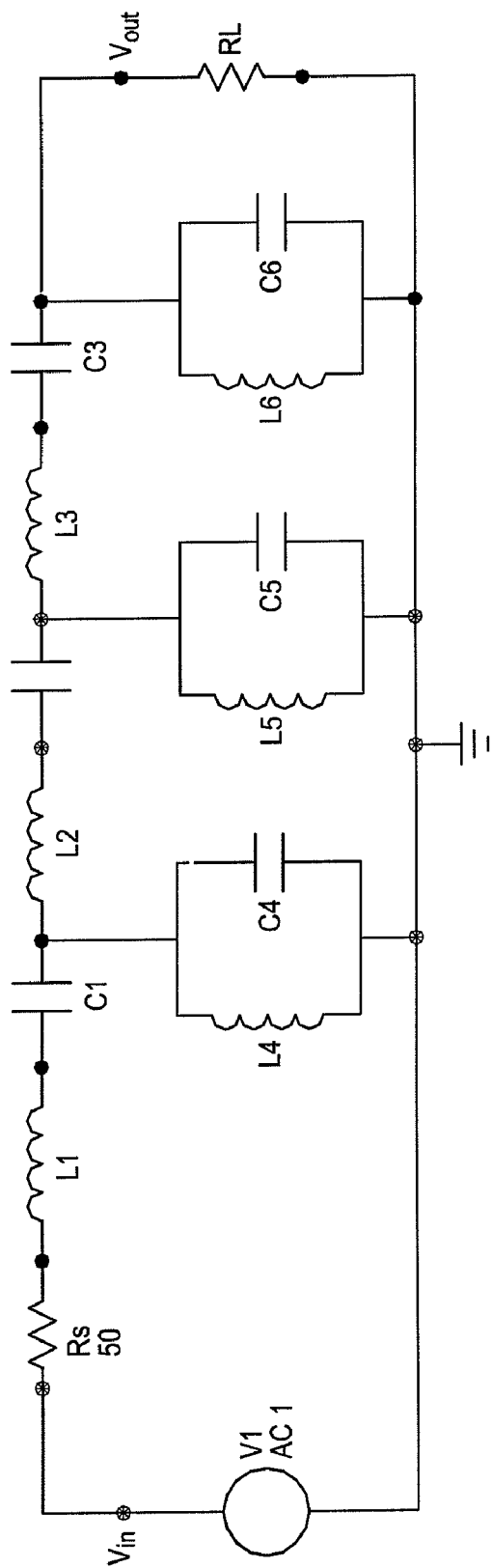
FIG. 11 illustrates the structure of the BPF used in analogs receivers.

Although matched filters may be analog or digital, a high or very high order analog filter would be required to select a small band of frequencies to accommodate a large number of carriers. Such a design may be cost prohibitive. For example, FIG. 11 illustrates an analog embodiment of a high order BPF, e.g. N=6, and may be implemented using series and parallel capacitors and inductors C1-C6 and L1-L6. Although theoretical values for C1-C6, and L1-L6 may be calculated to obtain a BPF comprising a narrow bandwidth, e.g. 0.1 MHz with center frequencies of either 9.95 or 10.05 MHz, physical components having the required values and tolerances are not readily available. Nor can they be approximated because it will change the filter characteristics.

Figure 2:
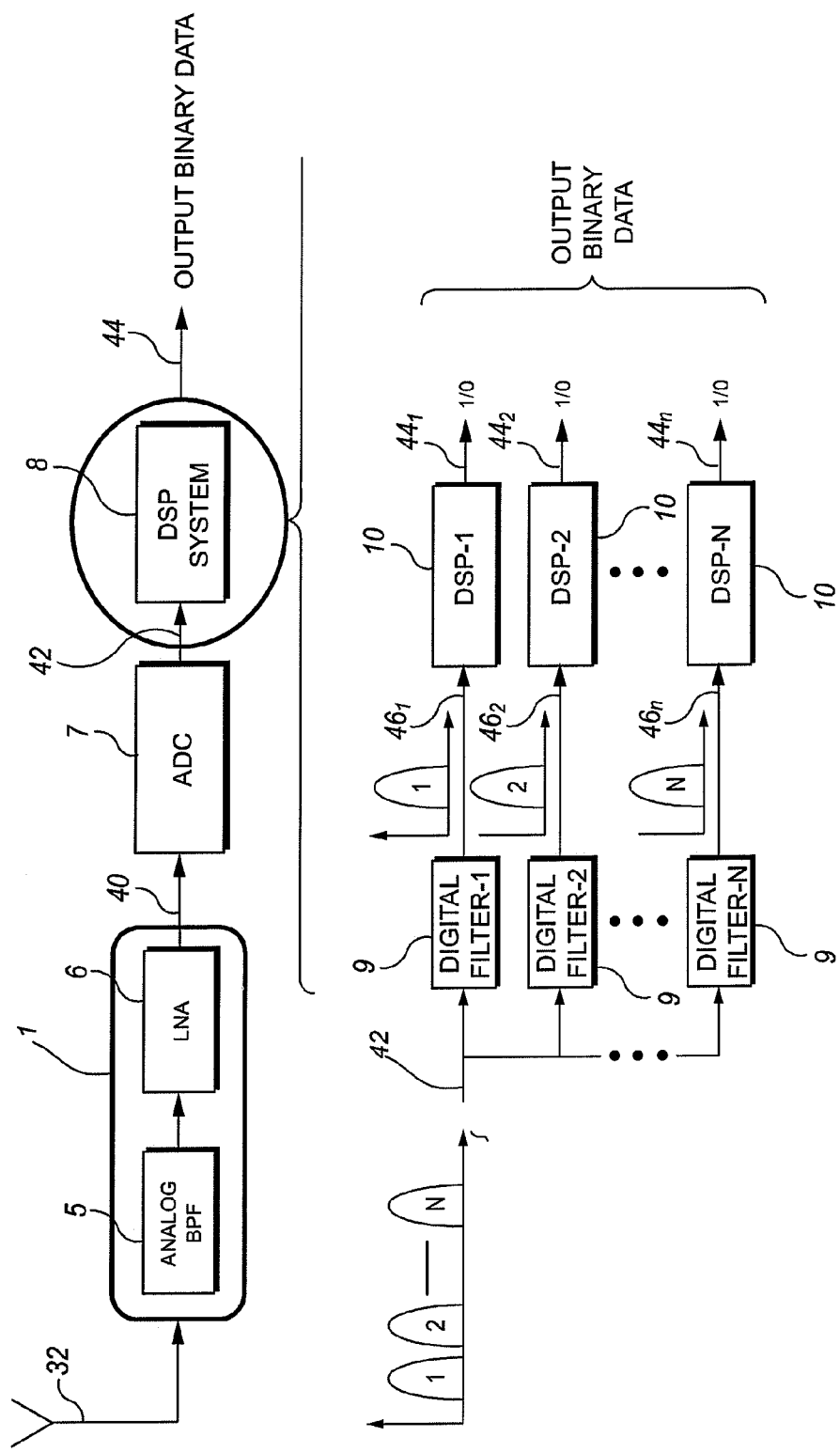
FIG. 2 is a block diagram of a digital implementation of the NBFM-FSK receiver system of FIG. 1.
Figure 4:
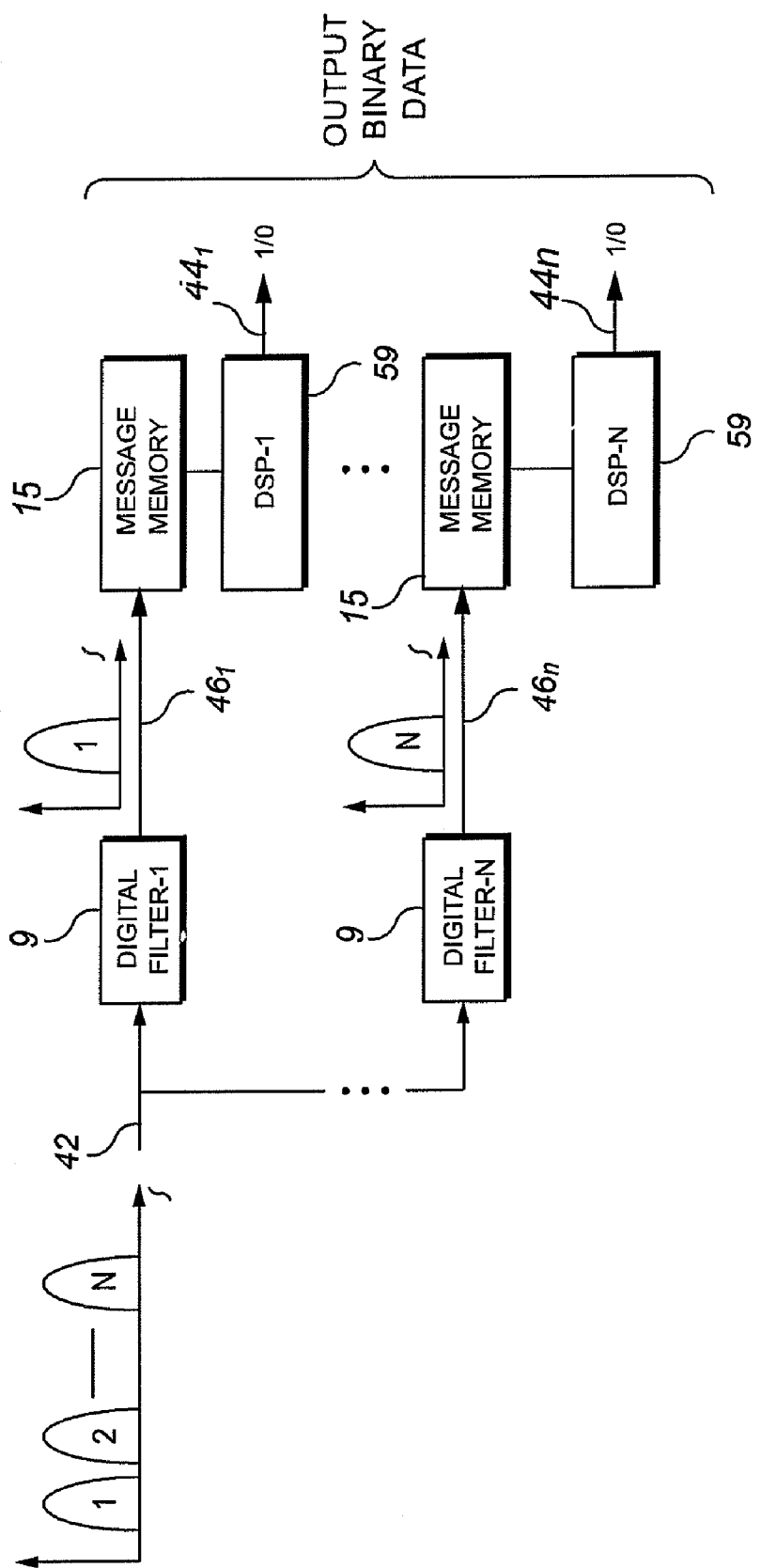
FIG. 4 Relative FSK System Block Diagram constructed in accordance with the receiver system of FIG. 1.

As shown in FIGS. 2 and 4, an alternate embodiment of BPF 2 consists of one or more programmable digital filters 1-N (9) that operate by performing digital math operations on an intermediate form of a signal. Unlike analog filters, digital filters can be easily configured without modifying the hardware if implemented using a programmable processor. Furthermore, digital filters can be made to work over a wide range of frequencies by changing the sampling frequency and whereas the precision achievable with analog filters is restricted (e.g. 60 to 70 dB stop band attenuation), the precision of digital filters, on the other hand, is limited only by the word length of the processor used.

One embodiment of a digital filter 9 includes infinite impulse response (IIR) filters that have an impulse response function which is non-zero over an infinite length of time and are used when sharp cutoff and high throughput are the primary requirements. Another embodiment of a digital filter 9 includes a finite impulse response (FIR) filter, which is called "finite" because its response to an impulse ultimately settles to zero. This is in contrast to IIR filters that have internal feedback and may continue to respond indefinitely.

A FIR filter has a number of useful properties which sometimes make it preferable to an infinite impulse response filter. For example, FIR filters are inherently stable, due to the fact that all the poles are located at the origin and thus are located within the unit circle, and they require no feedback loop to compound any rounding errors and therefore it is also easier to avoid overflow errors.

However, IIR filters will give fewer coefficients than a FIR filter and will normally require less computing resources than an FIR filter of similar performance. Digital filters may be implemented using FIR if the number of filter coefficient is not too large and if little or no phase distortion is desired.

Design of digital IIR filters is heavily dependant on that of their analog counterparts, the design of which is known to those knowledgeable in the field of filter design. Therefore, if a digital IIR filter is going to be implemented, an analog filter (e.g. Chebyshev filter, Butterworth filter, Elliptic filter) may be designed first, and then it is converted to digital by applying discretization techniques such as Bilinear transform or Impulse invariance.

Figure 12:
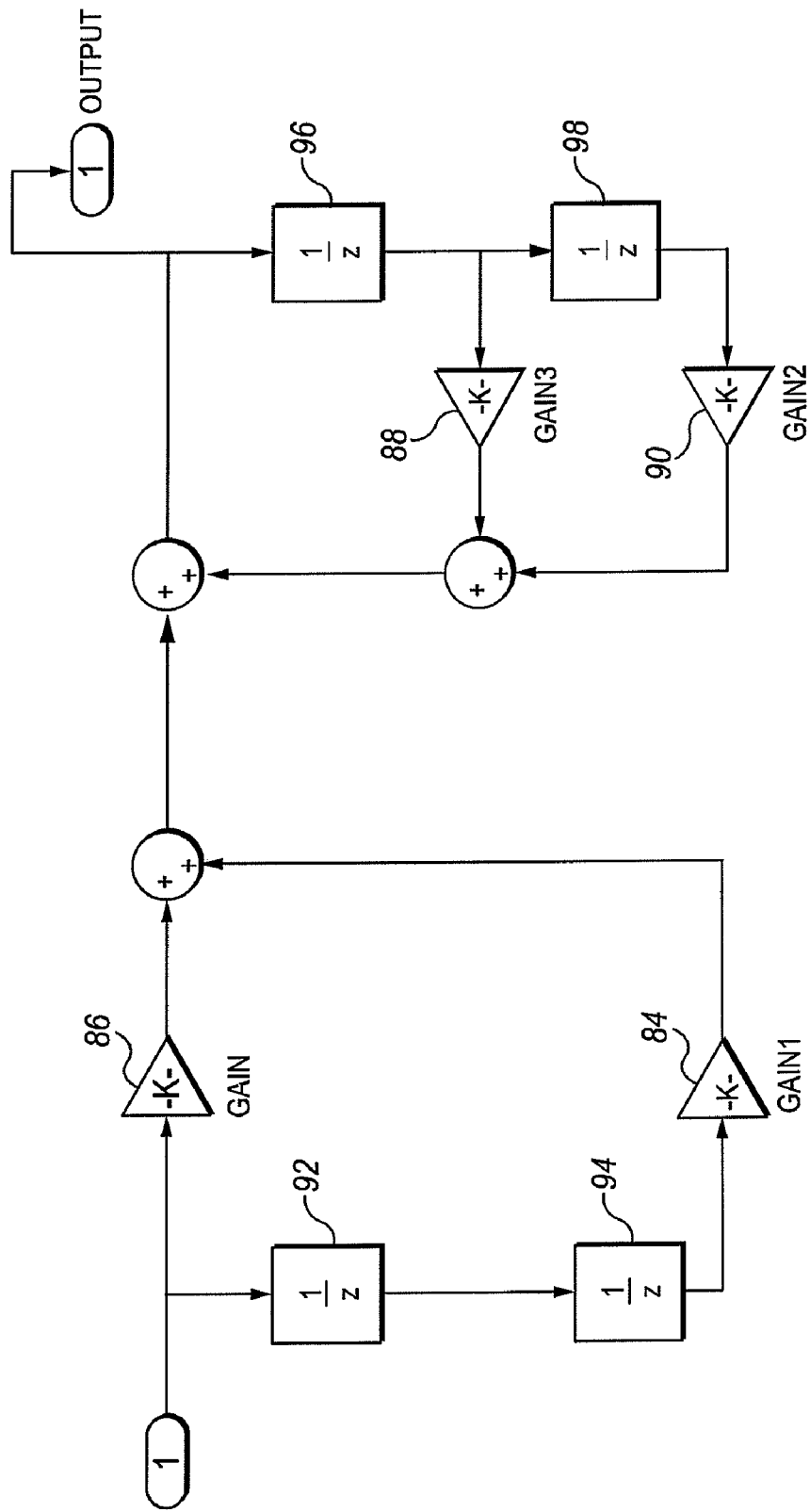
FIG. 12 illustrates a block diagram of one embodiment of the band pass filter according to the receiver of FIG. 1.
Figure 13:
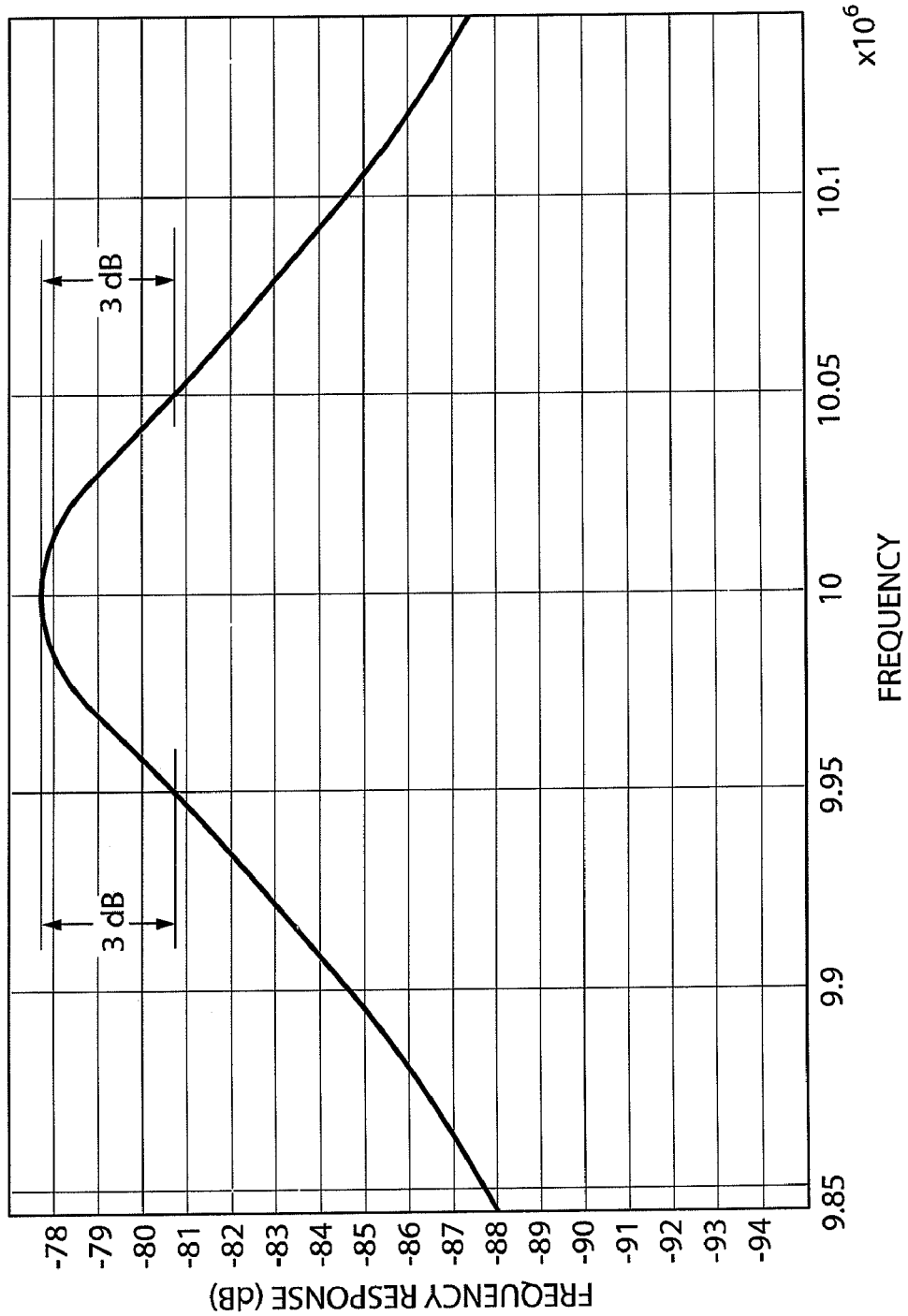
FIG. 13 illustrates a frequency response chart of a band pass filter according to the system of FIG. 1.

FIG. 12 illustrates one embodiment of a second order digital BPF designed using the Bilinear Z Transformation and comprises gain components 84, 86, 97 and 98, and delay elements 92, 94, 96 and 98 to provide an output with the following specifications:

Pass band: 9.95 MHz-10.05 MHz
Order: 2
Sampling frequency: 100 MHz

FIG. 12 shows the frequency response of the IIR digital BPF filter based upon the design of FIG. 12.

Another embodiment of digital filter 9 may include an automatic tunable digital BPF, which includes a digital filter having an input based on an output of a phase-locked loop (PLL) and operable to track and select the band containing the peak power spectral density (PSD). More specifically, the tunable BPF is a BPF with control voltages for both the center frequency and a quality factor ("Q-factor"). The tunable BPF is controlled by a digital signal processor (DSP) algorithm. The Q-factor is by definition the center frequency divided by the band width.

Referring back to FIG. 1, a frequency measurement system 3 evaluates the frequencies of the signals detected within the band. The decision device 4 decides whether the signals refer to a logical "1" or a logical "0" and outputs one or more binary data stream $36_1$-$36_n$.

FIG. 2 shows a block diagram of one embodiment of a NBFM-FSK system using multiple mark and space frequencies and digital filtering for frequency separation. The figure shows a receiver assembly 1 containing BPF 5, low noise amplifier 6, analog to digital converter 7, and a DSP system 8 generating binary data output stream 44. DSP system 8 may further comprise parallel DSP subsystems, each DSP subsystem processing a different input frequency band. Input signal 42 is filtered by each of digital filters 1-N (9) to generate a signal $46_1$-$46_n$ comprising an information signal within the selected particular frequency band. Signals $46_1$-$46_n$ are processed through subsystems DSP-1 (10) through DSP-N (10) operable to analyze a received sample and produce a single binary output bit $44_1$-$44_n$ for each input sample.

Figure 3:
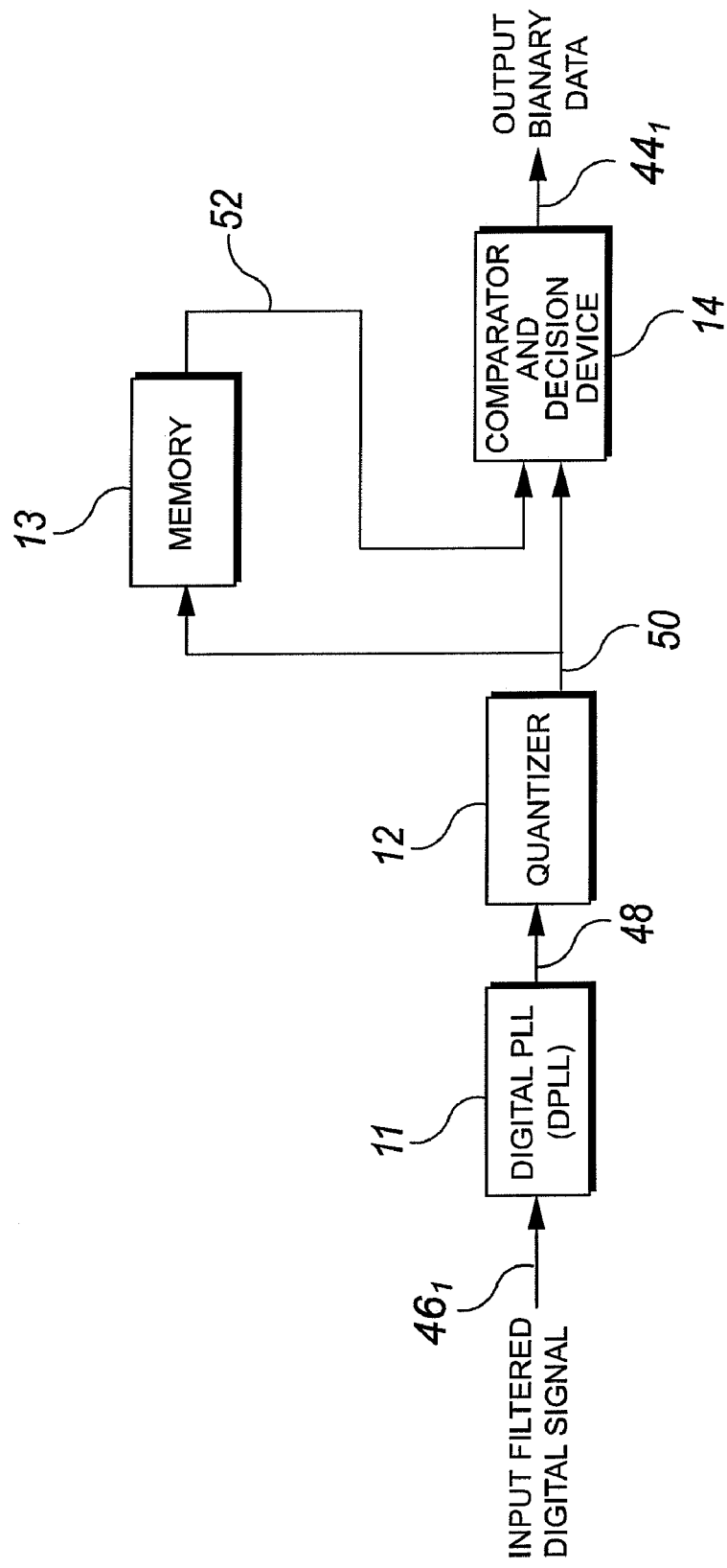
FIG. 3 is a block diagram of a DSP subsystem for frequency measurement according to the NBFM-FSK receiver system of FIG. 1.

FIG. 3 is a block diagram illustrating one embodiment of a DSP subsystem DSP-1 (10) that is representative of DSP-1 through DSP-N, illustrated in FIG. 2. Digital Phase-Locked Loop 11 (DPLL) is configured to receive a digital output signal $46_1$, wherein the output 48 of DPLL 11 is a DC voltage relative to the input signal frequency. As previously disclosed, digital PLL's are known in the field of communications and may consist of a voltage-controlled oscillator (VCO) that is tuned using a special semiconductor diode called a varactor. The VCO is initially tuned to a frequency close to the desired receiving or transmitting frequency. A circuit called a phase comparator causes the VCO to seek and lock onto the desired frequency, based upon the output of a crystal-controlled reference oscillator and a feedback circuit that comprises a phase comparator. If the VCO frequency departs from the selected crystal reference frequency, the phase comparator produces an error voltage that is applied to the varactor in order to bring the VCO back to the reference frequency.

Quantizer 12 may comprise an analog-to-digital converter (ADC) operable to quantize the input DC voltage and generate an output 50 comprising a high resolution 16 bit representation, $(V_H - V_L)/2^{16}$, having 65,536 discrete levels. The DC voltage range from $V_L$ to $V_H$ where $V_L$ is corresponding to $f_L$ (e.g. space frequency) and $V_H$ is corresponding to $f_H$ (e.g. mark frequency). ADC's are known in the field of electronics and the specific design and resolution of the quantizer 12 is non-limiting.

Memory 13 may be any type of read/write memory, including random-access memory (RAM), EPROM, EEPROM, flash memory cells, secondary or tertiary storage devices. The output 50 of the quantizer 12 serves an input to memory 13 and to comparator and decision device 14. The storing of the present frequency $f_n$ is done after comparing the present frequency $f_n$ with the previous one $f_{n-1}$.

Comparator and decision device 14 receives the output 50 of the quantizer 12 and the output 52 of memory 13, and is operable to compare the previously stored frequency, $f_{n-1}$, with the present frequency $f_n$ and generates an output bit comprising output $44_1$ based on the following algorithm:

$f_n > f_{n-1} \rightarrow$ output=logical "1"
$f_n < f_{n-1} \rightarrow$ output=logical "0"
$f_n = f_{n-1}$ and $V_n = V_{n-1} = V_H$ or $V_L \rightarrow$ output=previous output
$f_n = f_{n-1}$ and $V_n = V_{n-1} \neq V_H$ or $V_L \rightarrow$ output=no data received or not possible The time at which the frequency is estimated must be less than $1/R_b$, where $R_b$ is the bit rate. During every $1/R_b$ period, $f_n$ is stored in the memory 13, $f_n$ is compared to $f_{n-1}$, and a new output bit 44 is generated.

FIG. 4 illustrates another aspect of a digital processing subsystem, each subsystem comprising a digital filter 9, a message memory 15, and a DSP 59, each subsystem operable to measure the peak of the spectral power density (PSD) of the selected frequency band 46. Each DSP 59 is operable to generate a binary output $60_1$-$60_n$ of the decoded input data.

The power spectral density (PSD) of an input signal describes how the power (or variance) of a time series is distributed with frequency. Mathematically, the PSD is defined as the Fourier Transform of the autocorrelation sequence of the time series. An equivalent definition of PSD is the squared modulus of the Fourier transform of the time series, scaled by a proper constant term. The peak of the PSD may be determined by performing a fast Fourier transform (FFT), or digital Fourier transform (DFT) on the data stored in the message memory 15, the mechanics of performing a FFT or DFT being well known in the field of digital signal processing.

Figure 5:
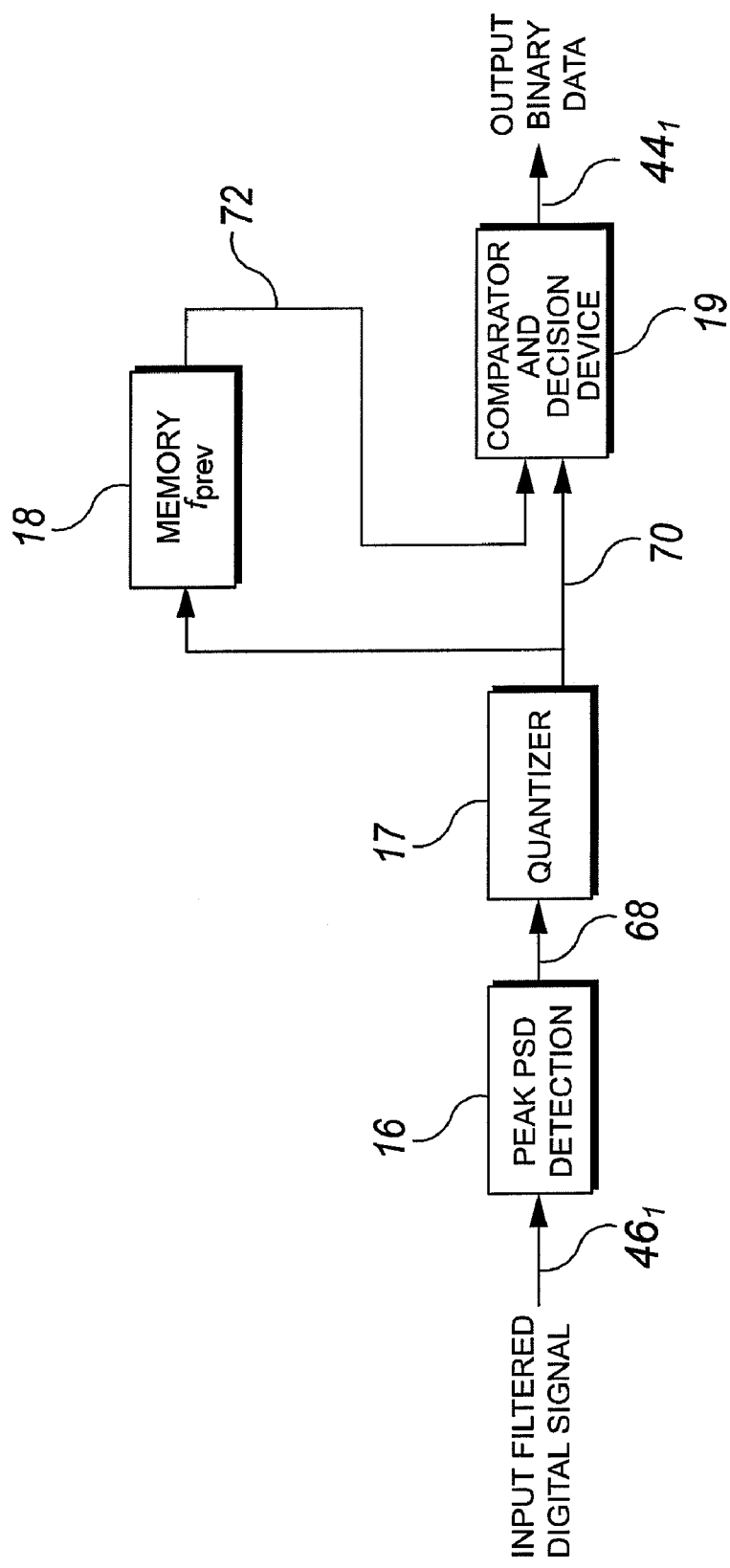
FIG. 5 illustrates one aspect of the DSP subsystem based on Peak PSD measurement constructed in accordance with the receiver of FIG. 1.

FIG. 5 illustrates one embodiment of the DSP-1 subsystem 59 of FIG. 4 and is representative of DSP-1 through DSP-N. The DSP of FIG. 5 is based on peak PSD measurement as discloses same above and comprises the same architecture as that shown on FIG. 3, except that the frequency of the received signal is determined by comparing the present and the previous frequency of the peak of spectral power density.

The DSP shown in FIG. 5 may comprise hardware and/or software components operable to implement an algorithm that calculates the power spectral density of all previous samples of a message and adds to them the last sample, in order to determine if the peak power has shifted.

More specifically, a digitally filtered input signal $46_1$ may be received by a peak PSD detector 16 that generates an output 68 that is fed into quantizer 17 generating an output signal 70 representing Peak PSD center frequency $f_{center}$. The peak PSD and its associated center frequency $f_{center}$, is determined based upon a predetermined number of samples, i.e., i, where i=the number of samples, the $i^{th}$ sample being the most recent sample. Signal $f_{center}$ 70 is stored in memory 18 and at the same time serves as an input to comparator and decision device 19, along with the previous peak frequency $f_{prev}$ 72 retrieved from memory 18. Comparator and decision device 19 generates an output $44_1$ based upon the analysis discussed below.

FIGS. 6 and 7 serve to illustrate the shift in frequency of the peak PSD due to each new received signal. For example, FIG. 7 illustrates the situation where the last sample shifts the computed peak power to the left, signifying that the current measured frequency is smaller than the previous one. FIG. 6, on the other hand, illustrates the situation wherein the computed peak power is shifted to the right, indicating that the current measured frequency may be larger than the previously calculated peak power frequency.

More specifically, FIG. 6 illustrates the power spectral density as a function of frequency for the case a "1" is received, wherein the current peak of the spectral power density (62) is located at a frequency which is larger than the peak location resolved prior to adding the current sample to the message memory. When the next sample i+1 is added to the message memory 15, the DSP calculates the PSD and the center frequency at which the PSD occurs, $f_{center}$ 70, based upon the i most recent samples. When the memory comprises only 40 samples, the oldest sample may be dropped or removed from the message memory 15.

FIG. 7 illustrates the PSD of a message of length i stored in memory 15 as a function of frequency, wherein a "0" (space frequency) has been received as a last sample that entered message memory 15. The figure shows that the peak of the spectral power density (64) has moved to lower frequency after the receipt of the "0" space frequency.

In one aspect, the algorithm detecting the peak power spectral density may be implemented by a group of DSP program steps that initializes the system, sets the baud rate, and defines the message length, the mark frequency, the space frequency, the center frequency and the modulation index.

Baud_rate=600 Kb/s.

The space frequency: $f_1$=9.95 Megahertz (MHz.)

The mark frequency: $f_2$=10.05 MHz.

Assuming the analog-to-digital sampling rate is 100 MHz, the sampling period T=1/100*$10^6$ The center frequency between mark and space (carrier): $f_{center}=(f_2+f_1)/2$.

Bit duration equals the time at which the transmission of one bit is completed and equals 1/baud_rate.

The modulating frequency (fm)=baud_rate/2.

The modulation index h, which is assumed to be ⅙ using a data rate of 600 Kb/s equals:

$$h = \frac{\Delta f}{f_m}$$

FIG. 8 shows an exemplary PSD versus frequency graph illustrating a result of applying FFT or DFT to the message memory 15 and processing the resulting to determine the peak of the PSD occurring at $f_{center}$ 80, halfway between the calculated avg_freq 78 and the prev_avg_freq 76.

The transmitter system transmits a sequence comprising N information signals of alternating 1's and 0's, (i.e., 010101 . . . ), where N is an even number.

The receiver detects the N sequence, apply the FFT to them to determine the PSD, and get the frequency, $f_{center}$ at which the PSD exists.

The system transmits data, which is random 0's and 1's. For each transmitted bit, the sample corresponding the first transmitted bit (which are stored in the message memory, which is an array of N bit samples) is removed, and the samples of the received signal of this bit (the samples during the bit duration) are added to the previous samples of the N received bits.

Referring to FIG. 5, the comparator and decision device 19 calculates the output 74 based upon the following comparisons:

If $f_{center}>f_{prev}$—then a "1" is received; and

If $f_{center}<f_{prev}$ then a "0" is received.

The method may then store the current bit as prev_bit, $f_{center}$ as $f_{prev}$ and proceed to the next bit transmission.

After applying the FFT on the received signal in the time domain, the frequencies in the frequency domain are discrete and are limited by the number of samples of the signal to which the FFT is applied.

The frequency resolution of the system is the space between any two successive frequencies in the frequency domain. The peak frequency is determined from the power integration of the PSD in the frequency domain. However, because the PSD is discrete, that is, the power is the sum of the PSD samples for all frequencies i in the frequency domain, in order to determine the center frequency, $f_{center}$, at which the peak occurs, all the summation of samples before the center frequency should be equal to half of the total power. Furthermore, because the frequencies are discrete it is preferable to calculate the power factor at two successive frequencies separated by the center frequency.

Figure 9:
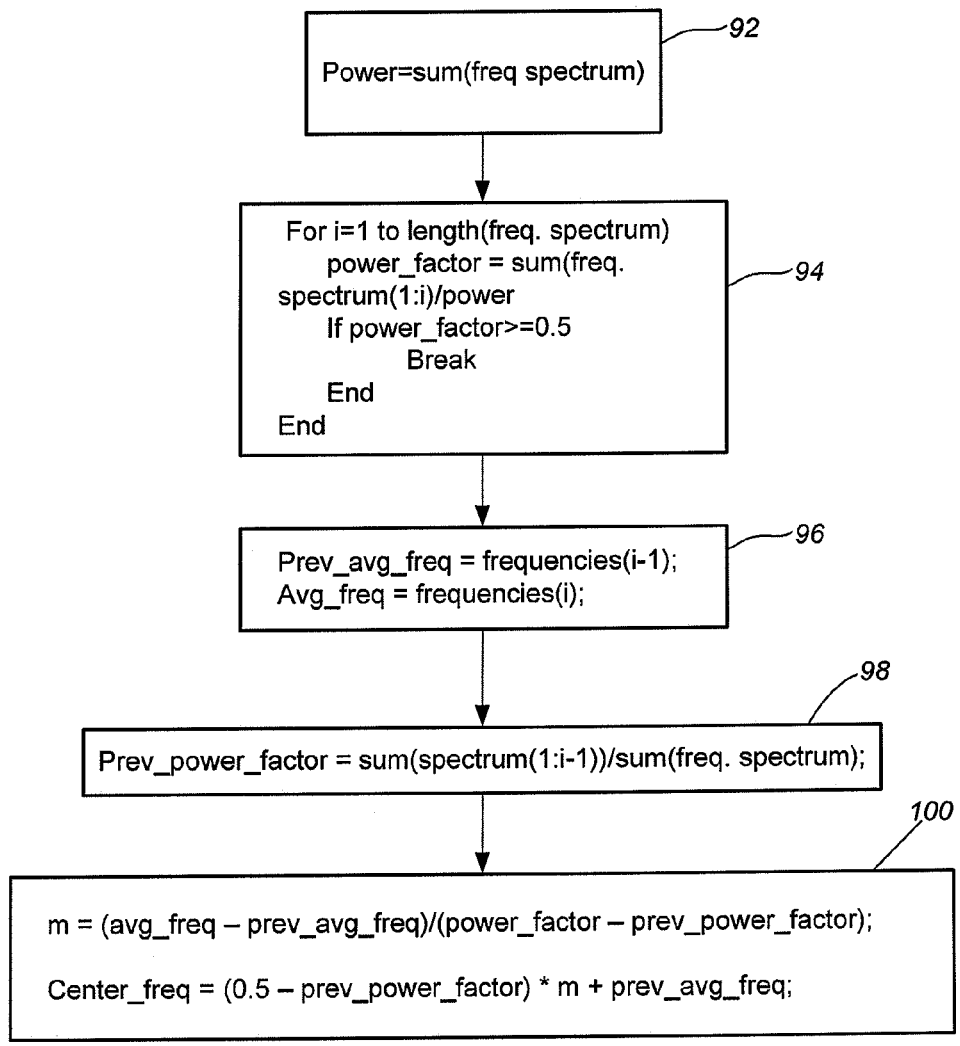
FIG. 9 illustrates one embodiment of a method to calculate the peak PSD and a center frequency at which the peak PSD occurs according to the DSP subsystem of FIG. 5.

FIG. 9 illustrates an exemplary embodiment of a method calculating the frequency of the peak PSD, $f_{center}$, based upon the above method. The method of FIG. 9 may also result in a zero probability of error (bit error rate) by adding zero padding and results in higher frequency resolution between successive frequency samples.

At step 92, the signal power is calculated as the sum of the power for the entire frequency spectrum of i frequencies.

At step 94, the frequency i, at which the power_factor is >=0.5 is determined and at step 96 is assigned to the variable avg_freq, and the frequency i−1, is assigned to the variable prev_avg_freq.

At step 98, the power factor associated with the previous average frequency, prev_avg_freq is calculated and assigned to the variable prev_power_factor.

At step 100, the frequency of the peak PSD is calculated and assigned to the variable center_freq, which represents the frequency, $f_{center}$, at the peak PSD.

The apparatus and methods described above are applicable for both one carrier NBFM system and for a multiple carrier system. For multiple carrier transmission system (each carrier having a mark and a space frequency), either BPF or matched filter schemes are used to separate the frequencies as disclosed in the multiple carrier embodiment of FIG. 1.

For example, orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM include high spectral efficiency, resiliency to RF interference, and lower multi-path distortion. These benefits are useful in terrestrial broadcasting scenarios that are typical multipath-channels (i.e. the transmitted signal arrives at the receiver using various paths of different length). Because multiple versions of the signal may interfere with each other, i.e., inter symbol interference (ISI), it becomes very hard to extract the original information.

Figure 10:
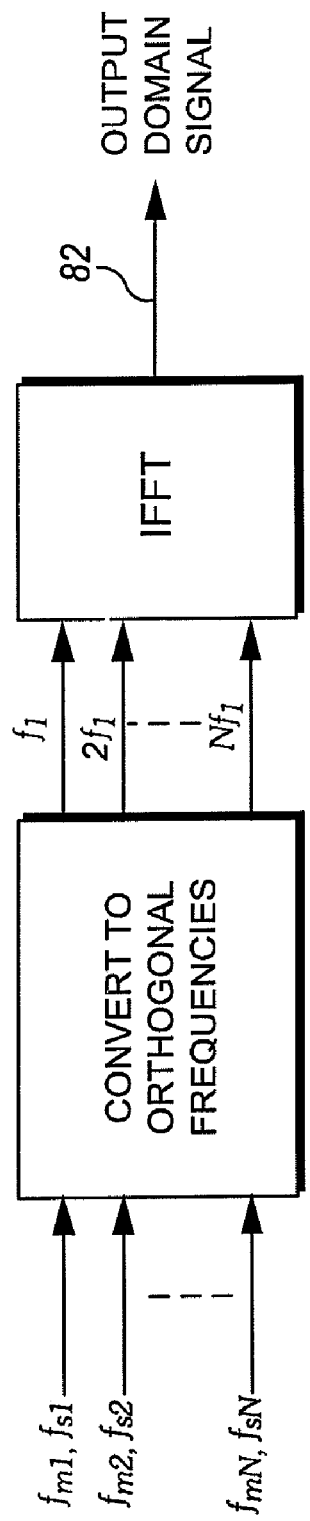
FIG. 10 illustrates a NBFM system using orthogonal frequencies.

A Multiple Carrier NBFM system, having N carriers and using N orthogonal frequencies is shown on FIG. 10. The mark and space frequencies, $f_{m1}$-$f_{mN}$ and $f_{s1}$-$f_{sN}$, respectively, are converted to orthogonal frequencies $f_1$-$Nf_1$ before inverse FFT (IFFT) procedure is applied to create the time domain signal 82. Here matched filters may be used at the receiver to separate the outputs of each frequency band.

The NBFM system of FIG. 10 would, by the use of orthogonal frequencies, increase data capacity and rates between a transmitter and a receiver. Such a receiver is illustrated in the multiple DSP systems of FIG. 2, in which digital filters are used to separate the different carriers.

While the foregoing disclosure shows illustrative aspects, it should be noted that various changes and modifications could be made herein without departing from the scope of the described aspects as defined by the appended claims. Additionally, any aspects described herein may be used in combination with any other aspect described herein. Furthermore, although elements of the described aspects may be described or claimed in the singular, the plural is contemplated unless limitation to the singular is explicitly stated.

What is claimed is:

1. A method for detecting modulated data within a signal band comprising:
    comparing a frequency of a current data sample with a frequency of a previous data sample;
    determining an output value of the received data sample based upon the comparison; and
    further comprising:
    generating a signal corresponding to the frequency of a received data sample;
    quantizing the generated signal corresponding to the frequency of the received data sample; and
    storing the quantized signal;
    wherein comparing a determined frequency of a current data sample with a frequency of a previous data sample comprises comparing the stored quantized signal corresponding to the frequency of a previously received data sample with the quantized signal of a current data sample.

2. The method of claim 1, further comprising filtering the signal band from a plurality of signal bands in a multiple carrier narrow band frequency modulated system (NBFM).

3. The method of claim 1, wherein comparing a frequency of a current data sample with a frequency of a previous data sample, comprises comparing orthogonal frequencies in a narrow band FSK communication system.

4. A narrow band frequency modulated (NBFM) communication apparatus, comprising:
    a digital phase lock loop (DPLL) configured to receive a NBFM signal, the DPLL configured to generate a DC voltage output corresponding to a frequency of the received NBFM signal;
    a quantizer circuit configured to receive the DC output voltage and generate a digital signal corresponding to the frequency of the received NBFM signal;
    a memory configured to store the digital signal generated by the quantizer circuit; and
    a comparator and decision device configured to compare a digital signal generated by the quantizer circuit with a previous digital signal stored in the memory and generate a binary output signal based upon the comparison.

5. The apparatus of claim 4, further comprising at least one matched filter configured to receive a multiple carrier FM modulated FSK signal and generate the NBFM signal received by the DPLL.

6. The method of claim 1, comprising:
    calculating a frequency corresponding to a location of a peak power spectral density (PSD) of a last set of received frequencies in a received message;
    recalculating the frequency of the location of the peak PSD for each sample received in the message; and
    determining an output based upon a shift in the frequency of the location of the peak PSD.

7. The method of claim 6, wherein determining an output based upon a shift in the frequency of the peak PSD, comprises:
    assigning a binary "1" to the output based upon a shift up in the frequency; and
    assigning a binary "0" to the output based upon a shift down in frequency.

8. The method of claim 6, wherein calculating a frequency corresponding to a location of a peak power PSD comprises applying at least one of a Fourier transform and digital Fourier transform to the received data.

9. The method of claim 6, further comprising:
    receiving a message including N samples, wherein N is defined as predetermined number of samples;
    calculating a frequency at which a peak spectral power density (PSD) occurs for the N samples;
    receiving a new sample corresponding to a new transmitted bit;
    recalculating the peak PSD frequency based upon the most recent N received samples; and
    determining an output bit based upon a calculated peak PSD frequency and a previous peak PSD frequency.

10. The method of claim 9, wherein receiving a message including N samples comprises receiving a message including 40-50 samples.

11. The method of claim 9, wherein receiving a message comprises receiving a carrier frequency comprising a modulation index that is not greater than 0.2.

12. The method of claim 9, wherein calculating a frequency corresponding to the peak power comprises applying at least one of a Fourier transform and digital Fourier transform to the received data.

13. The method of claim 9 further comprising filtering the FM FSK modulated data from a multi carrier signal.

14. A narrow band FM-FSK receiver, comprising:
- a filter configured to pass FM signal components of a predetermined signal band;
- a memory configured to store a predetermined number of filtered signal samples; and
- a digital signal processor (DSP) operably connected to the memory, the DSP configured to output a digital signal based upon a comparison of successive calculated frequencies associated with a peak power of a power spectrum density (PSD) of successive samples of the filtered FM signal samples.

15. The receiver of claim 14, wherein the DSP includes:
- a peak PSD detector operably connected to the memory, the peak PSD detector configured to calculate a peak PSD and a frequency at which the peak PSD occurs;
- a quantizer configured to digitize the frequency at which the peak PSD occurs;
- a peak PSD frequency memory device operably connected to the quantizer and configured to store the digitized frequency at which the peak PSD occurs; and
- a comparator and decision device operably connected to the quantizer and the peak PSD frequency memory device, the comparator and decision device configured to determine an output based upon a shift in the frequency at which the peak PSD occurs.

* * * * *